United States Patent Office 3,773,908
Patented Nov. 20, 1973

3,773,908
REMOVAL OF DISSOLVED LEAD FROM LITHIUM CHLORIDE SOLUTIONS
Ephraim A. Cuevas, Corpus Christi, Tex., and Wayne S. Johnston, Pittsburgh, Pa., assignors to PPG Industries, Inc., Pittsburgh, Pa.
Continuation of application Ser. No. 54,407, July 13, 1970. This application Mar. 27, 1972, Ser. No. 238,215
Int. Cl. C01d 11/02
U.S. Cl. 423—499     17 Claims

ABSTRACT OF THE DISCLOSURE

A process is described in which careful control of the hydroxyl ion concentration in a lithium chloride solution containing contaminating quantities of lead is utilized to provide for maximum precipitation of the dissolved lead compounds from the solution so controlled. A solubility curve developed for lead contained in lithium chloride solutions based upon the hydroxyl ion concentration of those solutions shows that the solubility of lead compounds in such solutions decreases as the milliequivalents of hydroxyl ions decreases to about 8. At milliequivalent concentrations of hydroxyl ions of from 8 to about 1.8, lead is relatively insoluble in lithium chloride solutions. As the hydroxyl ion milliequivalent drops below 1.8, the lead solubility again increases. Utilizing this discovery lithium chloride solutions containing lead compounds as contaminants are purified to provide lithium chloride solutions containing very low quantities of lead therein.

---

Figure 1:
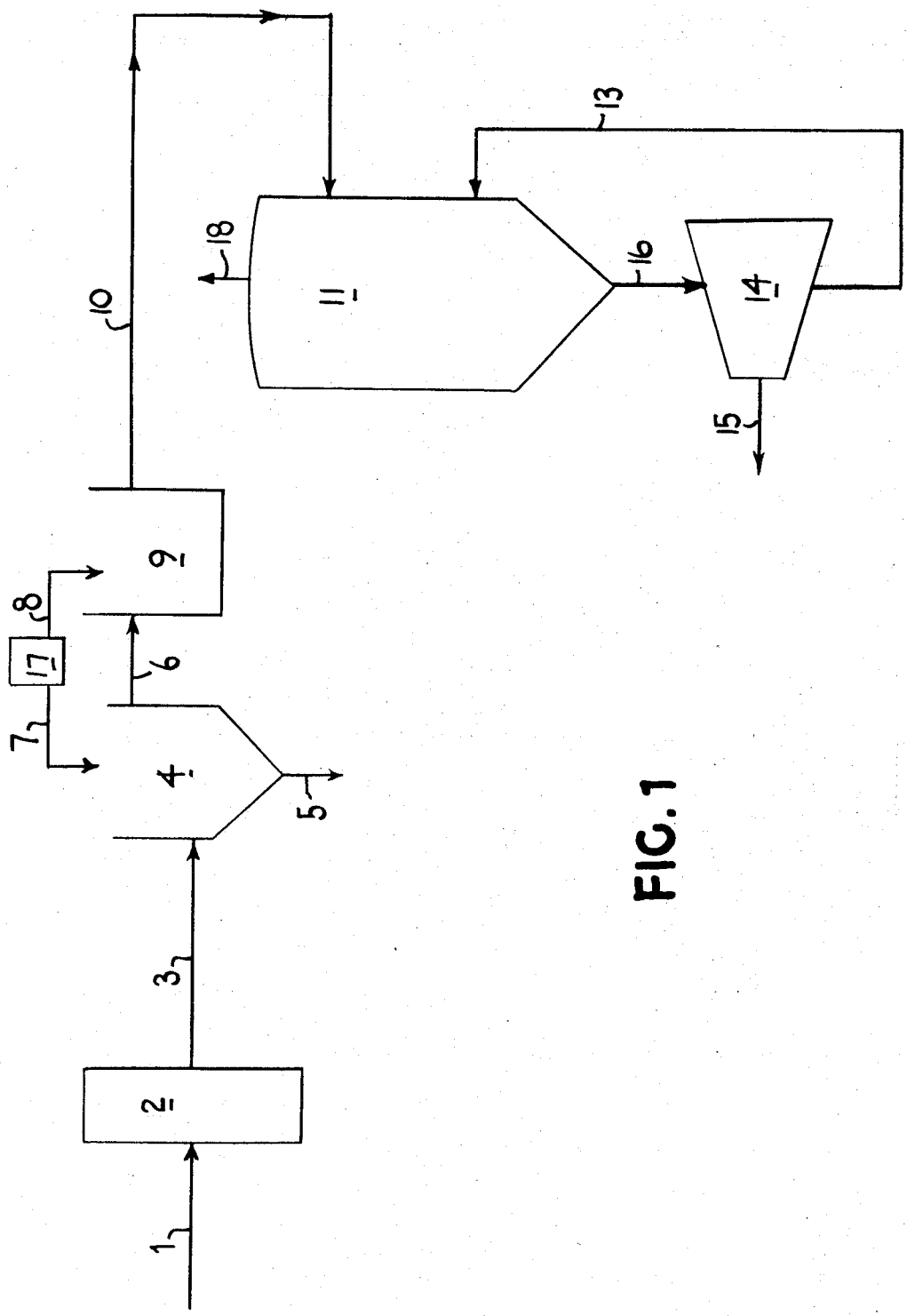

This is a continuation of application Ser. No. 54,407, filed July 13, 1970, now abandoned.

BACKGROUND OF THE INVENTION

Canadian Pat. 813,925, issued May 22, 1969, describes a process for the production of tetraalkyllead compounds. In this process metallic lead, metallic lithium and alkyl halides are reacted together, with or without a catalyst, to produce tetraalkyl halides and lithium halides in accordance with the following equation:

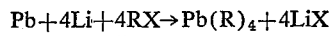

$$Pb + 4Li + 4RX \rightarrow Pb(R)_4 + 4LiX$$

wherein RX represents hydrocarbon halide, X represents chlorine, bromine and/or iodine and R represents an unsubstituted alkyl, alkenyl or aryl group.

In this process the product mass produced in the reactor, typically an autoclave, is contacted with water to dissolve the lithium halide content thereof. The tetraalkyllead component of the product mass is subsequently steam distilled and recovered. The aqueous solution of lithium halide produced by the contact of the product mass with water is found to contain substantial quantities of dissolved lead in addition to high concentrations of lithium halide and lithium hydroxide. Normally these solutions are treated as described in the aforementioned Canadian patent to recover lithium halide crystals. These crystals are then subjected to electrolysis to produce metallic lithium for use in the initial reaction for producing tetraalkyllead. In order to properly electrolyze lithium halide to produce metallic lithium, it has been found that the lithium halide should contain less than 90 parts per million lead. Thus, for example, lithium chloride crystals subjected to electrolysis produce high purity lithium metal efficiently when the lead content of the crystals is below 90 parts per million. When contaminated with lead above this concentration, deleterious results occur.

In co-pending application, U.S. Ser. No. 54,408, now abandoned, of Ephraim Cuevas, filed concurrently with this application, a process is described for the production of high purity lithium chloride (i.e. less than 100 p.p.m. lead) from solutions contaminated with lead involving controlling these solutions to provide for the precipitation of lithium chloride from solutions containing 0.3 percent lead or less therein. In establishing this control it is necessary that lead be removed from these solutions in an efficient and inexpensive manner.

THE PRESENT INVENTION

In accordance with the instant invention, applicants have discovered that by carefully controlling the hydroxyl ion concentration of lithium chloride solutions containing dissolved lead in quantities in excess of 0.2 percent, usually above about 0.25 percent, and typically above 0.4 percent by weight, that lead hydroxy chloride can be precipitated from the solution to such an extent that the dissolved lead content of the resulting solution can be reduced to below 0.2 percent by weight with relative ease. Indeed, by extremely careful control of the hydroxyl ion concentration of such solutions, lithium chloride solutions containing less than 0.1 percent by weight lead can be obtained readily.

Thus, in accordance with the instant invention lithium chloride solutions containing lithium hydroxide and dissolved lead are treated with an acid since such solutions typically are alkaline in nature, to provide therein a hydroxyl ion concentration ranging from 1.8 up to about 8 milliequivalents per 100 grams of solution. Preferably, the solution is adjusted with the acid so that there is maintained therein a hydroxyl ion concentration of between about 2.8 and about 4.5 milliequivalents per 100 grams of solution. The lithium chloride solution after precipitation of the lead hydroxy chloride formed by adjusting the milliequivalents of hydroxyl ions to within the above values, is filtered to remove the lead hydroxy chloride. The solution with the lead hydroxy chloride removed is then further acidified to a pH of 7 to convert any residual lithium hydroxide to lithium chloride. This pH adjustment provides a lithium chloride solution from which lithium chloride of high purity can be recovered. Generally such lithium chloride solutions will contain less than 0.2 percent by weight lead and typical values of about 0.1 percent by weight lead are realized. By controlling the lead concentration of these solutions in the evaporation system so that the lead content never exceeds 0.3 percent by weight a crystal of lithium chloride may be recovered which contains less than 100 parts per million lead by weight.

Turning to FIG. 1, a feed line 1 is shown for the introduction of solution to a storage vessel or tank 2. Liquor or solution from tank 2 is fed via line 3 to a treatment tank 4. This tank 4 is provided with a discharge line 5 at the bottom thereof and a liquid discharge line 6. The tank 4 is also provided with a second feed line 7 connected to a tank 17. Line 6 feeds into vessel 9 which is provided with a second feed line 8 also connected to tank 17. Line 10 leaving vessel 9 feeds into an evaporator-crystallizer 11 which is provided with a discharge line 16 at the bottom thereof. Line 16 feeds into a centrifuge. Centrifuge 14 has a solids discharge line 15 and line 13 for the recycle of liquor to evaporator-crystallizer 11.

In typical operation of the instant invention an aqueous solution of lithium chloride recovered from the aqueous phase resulting from water washing a reactor mass produced in accordance with the teachings in Canadian Pat. 813,925 is passed via line 1 into the storage tank 2. This lithium chloride solution which typically contains 0.4 percent lead or more by weight is passed preferably on a continuous basis, into vessel 4 where the milliequivalent concentration of hydroxyl ions in the solution is reduced by the addition of acid thereto via line 7 to a value of between 1.8 up to about 8 per 100 grams of solution. The precipitate resulting from this adjustment of the hydroxyl ion concentration is a lead hydroxy chloride and is removed from the solution via line 5. The solution is then passed to tank 9 via line 6 where additional acid is added thereto via line 8 to bring the solution to a neutral or acid pH. The solution is then passed into evaporator-crystallizer 11 where it is concentrated by heating it to drive off water therefrom through line 18. In vessel 11 solid crystals of lithium chloride are produced and are removed as a slurry via line 16 to the centrifuge 14. The excess liquor is fed via line 13 to evaporator-crystallizer 11 for further processing.

Figure 2:
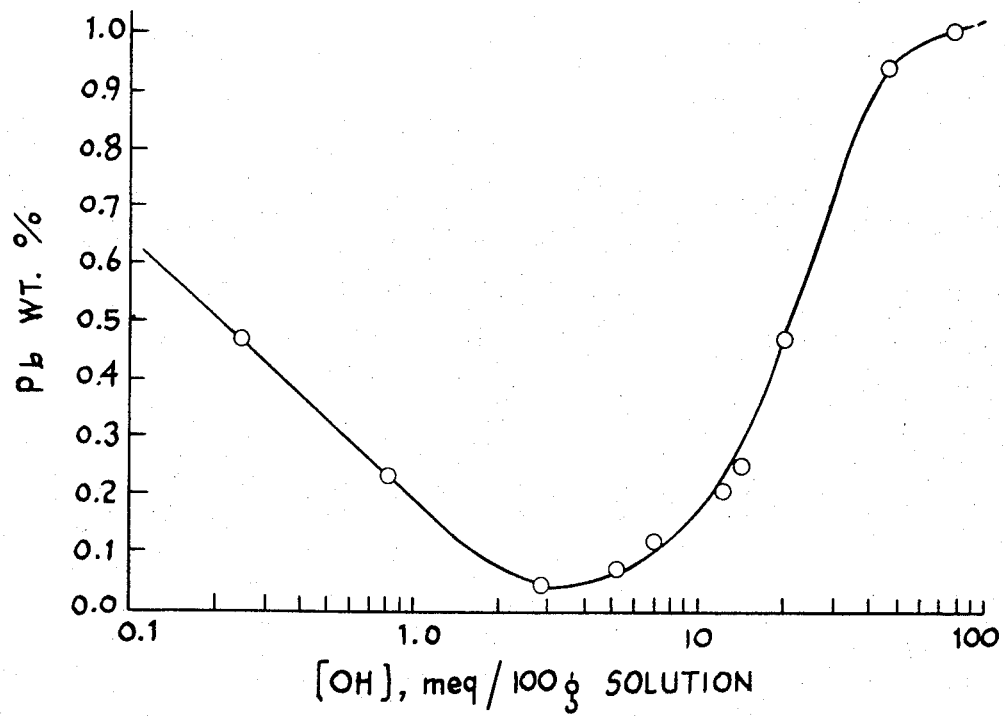

As will be readily appreciated from the solubility curve shown in FIG. 2, extremely low lead levels can be realized in lithium chloride solutions with the hydroxyl ion concentration maintained between about 1.8 to about 8. The following example illustrates the application of the instant invention to a lithium chloride solution containing large quantities of lead.

EXAMPLE

An aqueous lithium chloride solution reulsting from water washing a reaction mass is produced in accordance with the aforementioned equation and is fed through line 1 to storage tank 2. The lithium chloride solution contains on a weight basis 29.6 percent lithium chloride, 1.4 percent lithium hydroxide, 0.19 percent sodium chloride and 0.66 percent dissolved lead. Tank 17 is filled with concentrated hydrochloric acid (37 percent by weight HCl). The lithium chloride solution in tank 2 is fed through line 3 continuously to vessel 4 while acid is added thereto continuously from tank 17 via line 7 to provide in the solution in tank 4 a hydroxyl ion concentration of 2.8 milliequivalents per 100 grams of solution. Lead hydroxy chloride (PbOHCl) is precipitated in tank 4 at the hydroxyl ion concentration of 2.8 milliequivalents per 100 grams of solution and this lead-containing precipitate is removed via line 5. The solution is then passed from tank 4 via line 6 to a second tank 9 wherein further quantities of HCl are added to reduce the hydroxyl ion concentration of the solution to 0. This addition essentially converts all lithium hydroxide contained in the solution in tank 9 to lithium chloride. The solution removed from tank 9 via line 10 contains 32.1 percent lithium chloride, 0.19 percent sodium chloride and 0.05 percent by weight lead. This material is fed to evaporator-crystallizer 11 and evaporated therein to provide a lithium chloride concentration in the evaporating solution of 56 percent by weight. With a lead concentration maintained at 0.3 percent by weight in this solution, lithium chloride is crystallized from the solutions. The crystals produced are removed as a slurry via line 16 to the centrifuge 14. These crystals when dried, are found to contain 99.4 percent lithium chloride and 0.58 percent sodium chloride and 90 parts per million lead. Line 13 is used to recycle liquor to evaporator-crystallizer 11. When required to maintain the 0.3 percent level of lead in the evaporator, a bleed stream of liquor from the evaporator is removed and treated in accordance with the instant invention to remove lead and the purified liquor is then returned to evaporator-crystallizer 11.

As can be readily appreciated from the above example, the adjustment of the hydroxyl ion concentration of the lithium chloride solution is quite effective in reducing the dissolved lead content thereof. In other work using concentrations of dissolved lead of 0.23, 0.26 and 0.21 percent by weight and adjusting the milliequivalents of hydroxyl ions per 100 grams of solution with lithium hydroxide in neutral 40 percent lithium chloride solutions to 2.5, 2.2 and 2.6, respectively, lead concentrations after such treatment are found to be 99 p.p.m., 163 p.p.m. and 202 p.p.m., respectively.

Thus, the hydroxyl ion concentration may be adjusted in either direction using the curve of FIG. 2 as representative of a lithium chloride solution. Should the solution be alkaline, as they are typically found to be when recovered in a process such as disclosed in the aforementioned Canadian patent, acid is used to reduce the hydroxyl ion concentration to the desired limits. When the solution is acidic or neutral, the hydroxyl ion concentration is adjusted with a base such as an alkali metal hydroxide, preferably lithium hydroxide.

In general the instant invention is practiced in solutions at ambient temperature (25° C.) and under atmospheric pressure. Operations at lower or higher temperatures are contemplated however, and the solution treated may be at any temperature during the hydroxyl ion adjustment which will permit the adjustment to take place. Obviously, freezing and boiling points are to be avoided where they seriously interfere with the ability to control hydroxyl ion concentrations by the addition of a suitable acid or base.

Typically, acids employed to adjust hydroxyl ion concentrations will be strong mineral acids such as hydrochloric, nitric, and phosphoric acids. Preferably, hydrochloric acid is used and in concentrated form (36.5 percent HCl by weight). Indeed, any acids used are preferably used in concentrated form to reduce the water load in the evaporation system. In instances where the hydroxyl ion concentration is adjusted on an acidic or neutral solution, a base is employed. Materials such as alkali metal hydroxides and alkaline earth metal hydroxides are typical of suitable bases for this purpose. It is preferred that an alkali metal hydroxide, lithium hydroxide in particular, be employed. When desired, organic bases such as amines may be used. The particular base employed should be used in as concentrated a form as practical to keep water addition to the evaporation system to a minimum.

While the invention has been described with reference to certain specific examples and illustrative embodiments, it is not intended to be limited thereby except insofar as appears in the accompanying claims.

What is claimed is:

1. A method of purifying lithium chloride solution and in excess of 0.2 percent by weight of solution of dissolved lead, comprising adjusting the hydroxy ion concentration of the said lithium chloride solution to within the range of from 1.8 to 8 milliequivalents per 100 grams of solution to thereby precipitate lead compound therefrom, and separating lead compound so precipitated from the solution to thereby provide a purified lithium chloride solution having a lead concentration of less than 0.2 percent by weight, said adjustment of the hydroxyl ion concentration being conducted with a member selected from the group consisting of (a) a basic reagent when the lithium chloride solution is acidic or neutral and (b) a mineral acid selected from the group consisting of hydrochloric acid, nitric acid and phosphoric acid when the lithium chloride solution is alkaline.

2. The method of claim 1 wherein the hydroxyl ion concentration is adjusted to from 2.8 to 4.5 milliequivalents per 100 grams of solution.

3. The method of claim 1 wherein the basic reagent is lithium hydroxide.

4. The method of claim 1 wherein the purified lithium chloride solution is acidified with hydrochloric acid to a pH of about 7.

5. The method of claim 4 comprising the further step of crystallizing lithium chloride from the acidified, purified lithium chloride solution.

6. A method of removing dissolved lead from an aqueous solution of lithium chloride containing lithium hydroxide and in excess of 0.2 percent by weight of solution of dissolved lead comprising adding mineral acid selected from the group consisting of hydrochloric acid, nitric acid and phosphoric acid to the said lithium chloride solution to provide in the said solution a hydroxyl ion concentration of between about 1.8 and about 8 milliequivalents per 100 grams of solution and thereby precipitate lead compound therefrom, and separating the precipitate from the lithium chloride solution to thereby provide a purified lithium chloride solution substantially reduced in dissolved lead content.

7. The method of claim 6 wherein the hydroxyl ion concentration is adjusted to from 2.8 to 4.5 milliequivalents per 100 grams of solution.

8. The method of claim 6 wherein the lead compound is lead hydroxy chloride.

9. The method of claim 6 wherein the lead concentration of the purified lithium chloride solution is 0.1 percent by weight or less.

10. A method of reducing the dissolved lead content of an aqueous solution of lithium chloride containing lithium hydroxide and in excess of 0.2 percent by weight dissolved lead and having a hydroxyl ion concentration in excess of 10 milliequivalents per 100 grams of solution, comprising adding mineral acid selected from the group consisting of hydrochloric acid, nitric acid and phosphoric acid to said solution to adjust the hydroxyl ion concentration thereof to between about 1.8 and about 8 milliequivalents per 100 grams of solution and thereby precipitate lead compound therefrom, and separating the lead so precipitated from the solution to provide a purified lithium chloride solution containing less than 0.1 percent by weight lead.

11. A method of reducing the dissolved lead content of an aqueous solution of lithium chloride containing lithium hydroxide and in excess of 0.2 percent by weight dissolved lead, comprising adding hydrochloric acid to said solution to adjust the hydroxyl ion concentration thereof to between about 1.8 and about 8 milliequivalents per 100 grams of solution and thereby precipitate lead compound therefrom, and separating the lead so precipitated from the solution to thereby provide a lithium chloride solution containing less than 0.2 percent by weight lead.

12. The method of claim 11 wherein the aqueous solution of lithium chloride purified contains a hydroxyl ion concentration in excess of 10 milliequivalents per 100 grams of solution.

13. The method of claim 11 wherein the hydroxyl ion concentration is adjusted to from .8 to 4.5 milliequivalents per 100 grams of solution.

14. The method of claim 11 wherein the purified lithium chloride solution contains less than 0.1 percent by weight lead.

15. The method of claim 11 wherein the lead compound is lead hydroxy chloride.

16. The method of claim 11 wherein the purified lithium chloride solution is acidified with hydrochloric acid to a pH of about 7.

17. The method of claim 16 comprising the further step of crystallizing lithium chloride from the acidified, purified lithium chloride solution.

References Cited

UNITED STATES PATENTS

| | | | |
|---|---|---|---|
| 2,018,438 | 10/1935 | Christensen | 423—494 X |
| 2,703,272 | 3/1955 | Fuchsman | 423—499 X |

OTHER REFERENCES

J. W. Mellor's: "A Comprehensive Treatise on Inorganic and Theoretical Chemistry," vol. 2, 1922 ed., pp. 66 and 67. Longmans, Green & Co., New York, N.Y.

EDWARD STERN, Primary Examiner

U.S. Cl. X.R.

423—198, 202, 462, 494

PO-1050
(5/69)

UNITED STATES PATENT OFFICE
CERTIFICATE OF CORRECTION

Patent No. 3,773,908      Dated November 20, 1973

Inventor(s) Ephraim A. Cuevas et al.

It is certified that error appears in the above-identified patent and that said Letters Patent are hereby corrected as shown below:

Column 6, line 8, ".8" should read ---2.8---.

Signed and sealed this 16th day of April 1974.

(SEAL)
Attest:

EDWARD M. FLETCHER, JR.
Attesting Officer

C. MARSHALL DANN
Commissioner of Patents